(12) United States Patent
Lin

(10) Patent No.: US 11,068,440 B2
(45) Date of Patent: Jul. 20, 2021

(54) APPLICATION-SPECIFIC COMPUTING SYSTEM AND METHOD

(71) Applicant: Jimmy C Lin, Anaheim, CA (US)

(72) Inventor: Jimmy C Lin, Anaheim, CA (US)

( * ) Notice: Subject to any disclaimer, the term of this patent is extended or adjusted under 35 U.S.C. 154(b) by 348 days.

(21) Appl. No.: 16/104,807

(22) Filed: Aug. 17, 2018

(65) Prior Publication Data
US 2020/0057750 A1   Feb. 20, 2020

(51) Int. Cl.
*G06F 16/13* (2019.01)
*G06F 16/182* (2019.01)

(52) U.S. Cl.
CPC ............ *G06F 16/13* (2019.01); *G06F 16/183* (2019.01)

(58) Field of Classification Search
CPC ......... G06F 16/13; G06F 16/183; G06F 16/90
See application file for complete search history.

(56) References Cited

U.S. PATENT DOCUMENTS

| | | | |
|---|---|---|---|
| 5,442,752 A * | 8/1995 | Styczinski | G06F 3/0601 711/114 |
| 6,151,641 A | 11/2000 | Herbert | |
| 6,256,748 B1 | 7/2001 | Pinson | |
| 2005/0216680 A1 * | 9/2005 | Levy | G06F 3/0676 711/162 |
| 2006/0106827 A1 * | 5/2006 | Brown | G06F 16/10 |
| 2007/0192560 A1 | 8/2007 | Furuhashi | |
| 2009/0271412 A1 * | 10/2009 | Lacapra | G06F 3/067 |
| 2013/0318214 A1 * | 11/2013 | Tebay | H04L 67/125 709/219 |
| 2014/0201562 A1 * | 7/2014 | Breakstone | G06F 3/0625 713/600 |
| 2015/0143027 A1 | 5/2015 | Luo et al. | |
| 2018/0074724 A1 | 3/2018 | Tremblay et al. | |

* cited by examiner

*Primary Examiner* — Mariela Reyes
*Assistant Examiner* — Fatima P Mina
(74) *Attorney, Agent, or Firm* — Donald R. Boys; Central Coast Patent Agency LLC

(57) ABSTRACT

A computing system has a central processing unit (CPU), a plurality of n digital data repositories R1-Rn, having a common sector size, a file system, and a digital bus connecting the CPU and the plurality of n digital data repositories R1-Rn. The file system receives an original file to be stored of FS bits in size, creates a new file of NFS bits, comprising all the data structure of the original file, NFS evenly divisible by n and by the common sector size, divides the NFS by n, creating n portions P1-Pn, and stores one portion to each disk in the plural array simultaneously.

12 Claims, 5 Drawing Sheets

APPLICATION-SPECIFIC COMPUTING SYSTEM AND METHOD

BACKGROUND OF THE INVENTION

1. Field of the Invention

The present invention is in the field of computing machines and operation of said machines and pertains more particularly to architecture and methods of storing relatively large data files.

2. Description of Related Art

Computer architecture, and data transmission and retrieval between Central Processing Units (CPUs) and data repositories is a well-known art. Applications of computers and data repositories to high-rate data transmission and storage is also well known to the skilled artisan, and minimizing latency in data storage is understandably a goal highly sought. In many circumstances data transmission to a storage architecture may be accomplished at a rate substantially greater than the transmitted data may be stored, and this may result in irretrievable loss of important data.

Further to the above, the inventor determines that storage efficiency and overall rate in data handling, for optimum results, need to be faster than transmission and arrival rates. Further, the present inventor has discovered techniques heretofore unknown, in how to efficiently and successfully store substantially large data files. What is clearly needed in the art are better data storage hardware, hardware configuration, and software solutions, to decrease latency and increase storage rate and efficiency.

BRIEF SUMMARY OF THE INVENTION

In an embodiment of the invention a computing system is provided, comprising a central processing unit (CPU), a plurality of n digital data repositories R1-Rn, having a common sector size, a file system, and a digital bus connecting the CPU and the plurality of n digital data repositories R1-Rn. The file system receives an original file to be stored of FS bits in size, creates a new file of NFS bits, comprising all the data structure of the original file, NFS evenly divisible by n and by the common sector size, divides the NFS by n, creating n portions P1-Pn, and stores one portion to each disk in the plural array simultaneously.

In one embodiment the digital bus is organized into n logical channels, one to each one of the n digital data repositories, and the file system routes data to each digital data repository along the logical channel leading to each digital data repository. In one embodiment the digital bus is organized into n dedicated physical data lanes, one to each one of the n digital data repositories, and the file system routes data to each digital data repository along the data lane leading to each digital data repository. And in one embodiment the digital bus is organized into m dedicated physical data lanes, serving n data repositories, where n is an even multiple of m, with each data lane serving n/m data repositories.

In one embodiment the system is dedicated to an application wherein average and maximum file size is known, and number and throughput characteristics of disks in the plural array are chosen to maintain throughput in the data repositories within the optimal range for minimum latency. And in one embodiment the system further comprises an Unmanned Vehicle (UV) collecting digital files through one or more sensors, including image sensors, wherein the UV sends the files to the computing system for storage in the plurality of data repositories.

In another aspect of the invention a computing method is provided, comprising receiving, at a CPU of a computing platform having a plurality of n data storage repositories connected to the CPU by a bus structure, a file to be stored of FS bits in size, creating, by a File System (FS), a new file of NFS bits comprising all the data structure of the original file, NFS evenly divisible by n and by a common sector size of the n data storage repositories, dividing the NFS by n, creating n portions P1-Pn, and storing one portion to each disk in the plural array simultaneously.

In one embodiment the method further comprises organizing the digital bus into n logical channels, one to each one of the n digital data repositories, and routing data by the file system to each digital data repository along the logical channel leading to each digital data repository. In one embodiment the digital bus is organized into n dedicated physical data lanes, one to each one of the n digital data repositories, and the file system routes data to each digital data repository along the data lane leading to each digital data repository. And in one embodiment the digital bus is organized into m dedicated physical data lanes, serving n data repositories, where n is an even multiple of m, with each data lane serving n/m data repositories.

In one embodiment the method is dedicated to an application wherein average and maximum file size is known, and number and throughput characteristics of disks in the plural array are chosen to maintain throughput in the data repositories within an optimal range for minimum latency. And in one embodiment the method further comprises collecting digital files through one or more sensors, including image sensors, of an Unmanned Arial Vehicle (UAV), wherein the UAV sends the files to the computing system for storage in the plurality of data repositories.

DETAILED DESCRIPTION OF THE INVENTION

Figure 1:
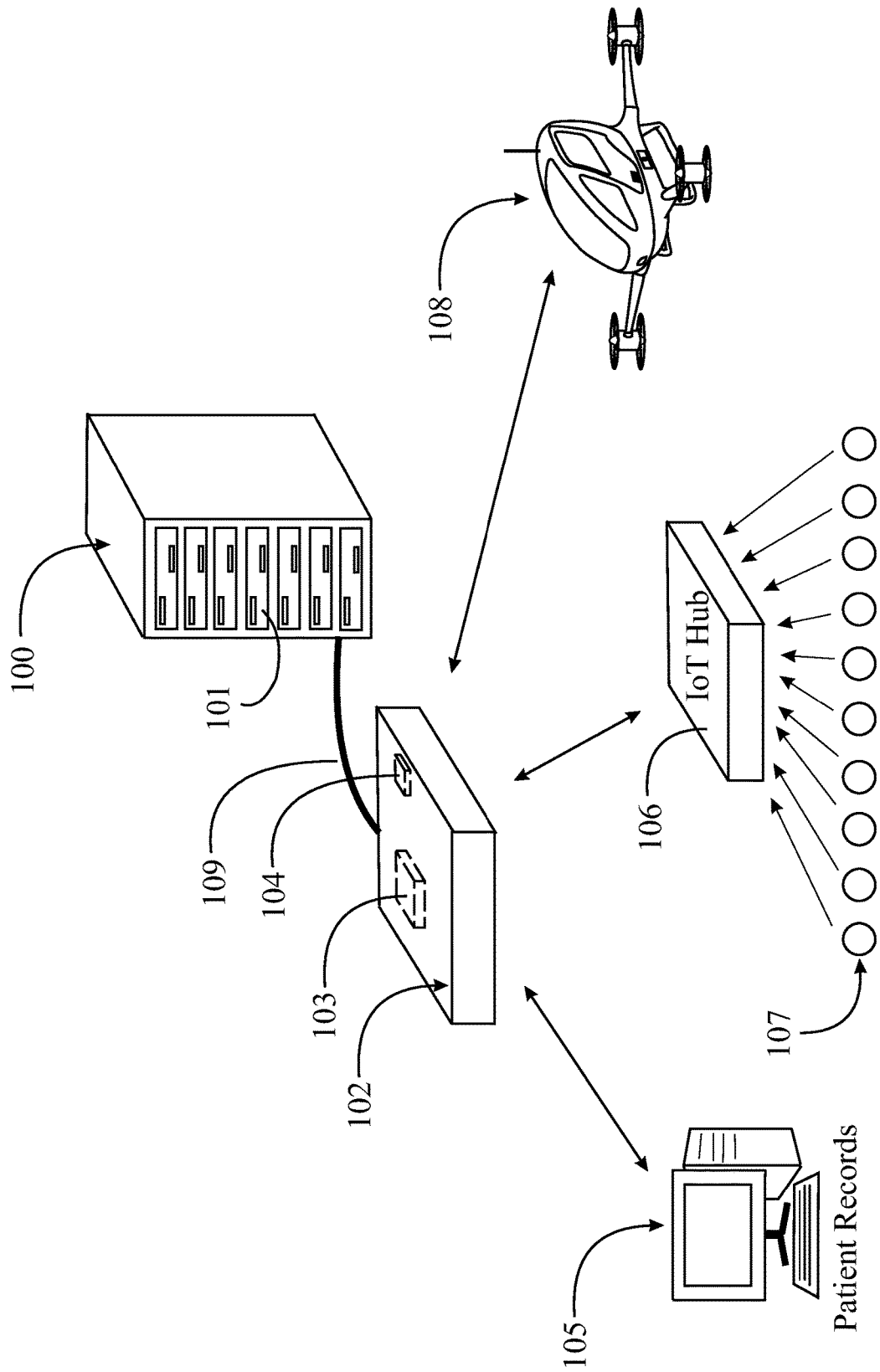
FIG. 1 is a diagram of a computerized system in an embodiment of the present invention.

FIG. 1 is a diagram of a computerized system in an embodiment of the present invention, wherein digital data is transferred and stored at substantial rates. In this example the storage architecture is an array 100 of digital data repositories 101 which may be hard disks, optical disks, flash devices, or other sorts of digital storage devices. It is quite common in circumstances where very large amounts of data must be stored to configure the system with an array, that is, a plurality, of storage devices, as a single such device would have inadequate capacity.

In some arrangements, the plural device array may be referred to as a RAID array, an acronym for Redundant Array of Independent Disks. RAID is a dominant scalable architecture, and often used in what is known in the art as cloud storage. But a RAID array is more than just a plurality of storage devices. A RAID array also uses a file system that follows a specific RAID protocol, of which there are several. In some embodiments of the present invention the plural storage architecture may indeed be a RAID array, but the invention is not limited to RAID. In some embodiments of the invention the file system may be a proprietary system, dedicated to a specific purpose.

In FIG. 1 an exemplary architecture is shown in which a computerized platform 102 comprises a CPU 103, data transceivers 104, and a file system (not shown as a separate element) operated by the CPU, responsible for managing and storing incoming data files. Storage array 100 in this example is a common rack-mount, housing six independent disks 101. The number, of course, may be fewer or many more than 6. Line 109 represents a bus system connecting platform 102 and the plurality of data storage devices in the array.

In a typical plural drive data is distributed across the drives in any one of several ways. In a RAID system, data storage management may follow a RAID level, depending on the required level of redundancy and performance. Different schemes, or data distribution layouts, are named in the art by the word RAID followed by a number, for example RAID 0 or RAID 1. Each schema, or RAID level, provides a different balance among key goals: reliability, availability, performance, and capacity. RAID levels greater than RAID 0 provide protection against unrecoverable sector-read errors, as well as against failures of physical drives. The file system of platform 102 manages the physical disk drives and presents them to the CPU and file system as logical units.

Three circumstances are represented in FIG. 1 as examples of large amounts of data to be managed and stored, for later retrieval. One example is represented by a computer platform 105 representing data management in a health care and medical environment. Integration of data management and storage in the medical industry has been growing at a substantial rate, and a great deal of data is collected, associated, and stored. Connection and communication in this circumstance is almost invariably through the well-known Internet network.

A second circumstance in FIG. 1 is related to the well-known phenomenon known in the art is the Internet of Things (IoT). The IoT is a network of physical devices, vehicles, home appliances and other items embedded with electronics, software, sensors, actuators, and connectivity which enables these objects to connect and exchange data. An IoT hub 106 is represented collecting data from an array 107 of individual elements enabled as IoT. Data thus collected is transmitted to platform 102 where the CPU operating the file system stores the incoming data in the individual disks in the plural array. In industrial control, IoT is increasingly employed by enabling sensors and activators to communicate through the Internet for process control, for example.

A third circumstance is illustrated by a drone 108, which may be a military vehicle collecting intelligence by image devices and the like. Substantial on-board data storage is prohibitive because of weight considerations and other factors, and very rapid transmission and storage in these circumstances is often critical. A great deal of important data in such circumstances is transmitted to a central terminal, such as platform 102, to be stored, and latency in storage may result in lost data.

The skilled person will appreciate that the examples briefly described above are exemplary only, and that there are many more circumstances where very substantial quantities of data may be generated and may need to be stored.

Figure 2:
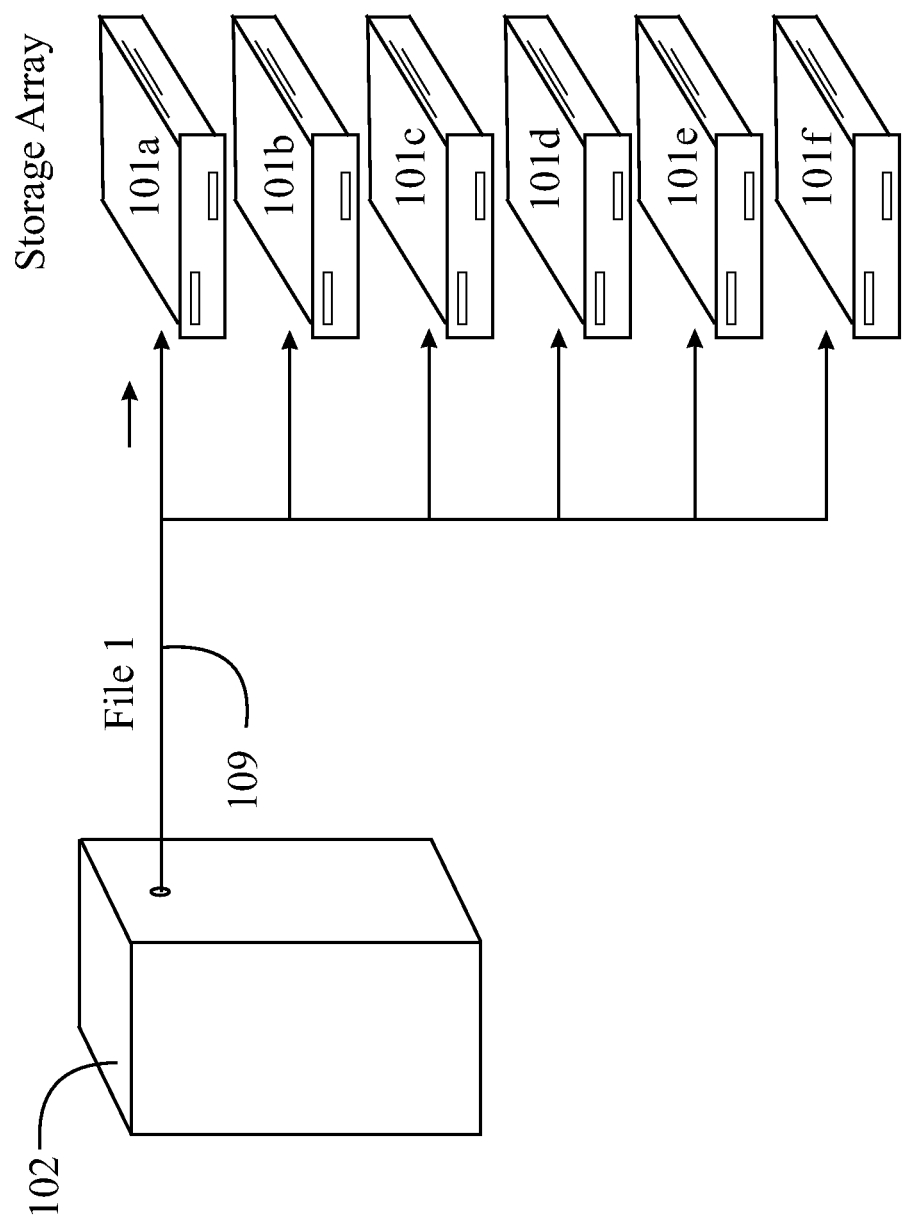
FIG. 2 is a very simplified diagram depicting storage in and among individual disks in a storage array, in conventional art.

FIG. 2 is a very simplified diagram depicting storage in and among individual disks in a storage array, in conventional art. Platform 102 is illustrated as connected to disks 101*a* through 101*f* by a bus system 109. A file 1 is depicted as in process of storage on disk 101*a*. In some conventional art, given a file to be stored of, say X Bytes, that file will be stored by consecutive writes to disk 101*a*, given that there is usable space in disk 101*a*. If disk 101*a* is saturated prior to finishing the storage of File 1, storage will shift to sequential writes to writable locations on disk 101*b*. Writes will be done thus sequentially through the six disks, if necessary, until file 1 is stored. Typically, however, all of file 1 will be stored on disk 101*a*. Although there are other schemes for sharing storage activity among drives in disk arrays, all are more or less takeoff on sequential storage. The skilled person will understand that this sequential process will ensure that storage volume will be shifted heavily toward disk 101*a*.

Figure 3:
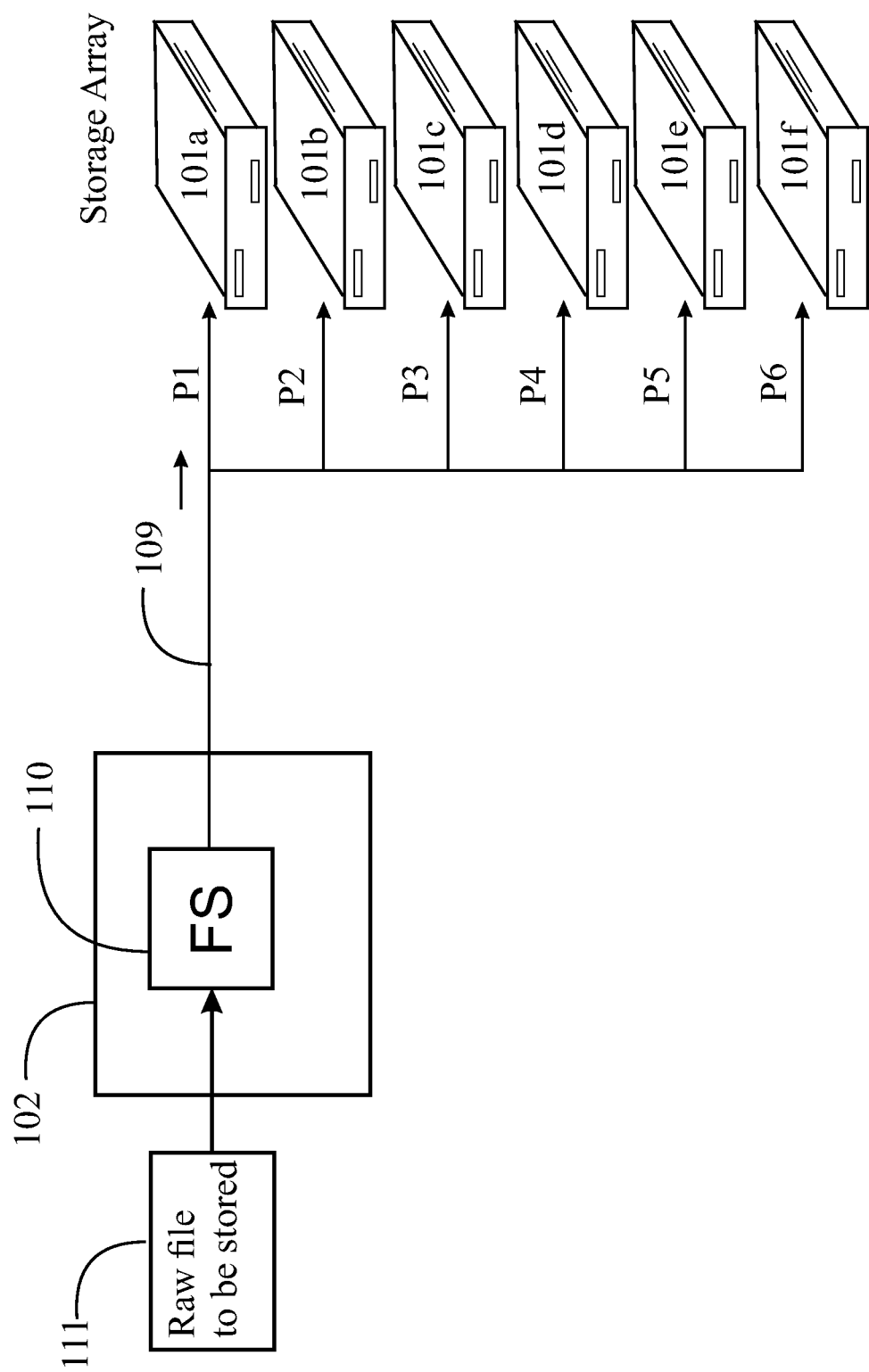
FIG. 3 is a very simplified diagram depicting storage in and among individual disks in a storage array, in an embodiment of the invention.

FIG. 3 is a simplified diagram illustrating a unique forced symmetry process for sharing storage among disks in a plural array, according to an embodiment of the present invention. In this unique process, an incoming file 111 to be stored must be divided into exactly equal portions, that is, the same number of bits in each portion, with one portion to be stored in parallel to each one of the disks in the plural array. Another inflexible requirement is that each portion must be an equal multiple of the sector size of the disk, and each disk in embodiments of the invention must have a common sector size.

The inventor understands that newer HDDs use 4096-byte (4 KiB) sectors, which are known as the Advanced Format (AF). Therefore, sector size of disks in the plural array in most embodiments of the invention are all AF. This is not to say that the invention is limited to AF sector size, as any other sector size may be accommodated by adjusting processing of a file to be stored.

The skilled person will understand that an incoming file to platform 102, to be stored to the disk array, will be received over a network connection in a network protocol, such as packets in Internet protocol. So the representation in FIG. 3 is exemplary and representative, but is sufficient to describe the limitations of the invention in one embodiment.

A file system (FS) in FIG. 3, which may be entirely software in some embodiments, but may also have hardware components in some embodiments, is provided to process files to be stored. Referring to the inflexible requirements above, FS 110 operates to amend file 111 to a new file size (NFS) of a number of bits that is evenly divisible by both the number of disks in the plural storage array, and by the common sector size of each of the disks in the plural array. In this particular example, NFS must be evenly divisible by 6 and also by 4096.

The skilled person will realize that the mathematics is trivial to accomplish the requirement of the invention, involving simple division, rounding, and filling in with zeros to accomplish a usable NFS. In most cases the NFS is accomplished by addition of zeros to the original file, which may be added in one or in several different places in a file.

Processing by FS 110 provides, in this instance, six file portions, P1-P6, each of exactly the same number of bits, evenly divisible by 4096, or in other embodiments by the common sector size of the disks in the plural array. In the current art, the location of the data cannot be predetermined and may be scattered in non-adjacent sectors over a device, so a data request would end up needing to search all devices and locations. In the case of an access greater than the hardware size but not an integer multiple of the hardware sector size, the location of the remainder again cannot be predetermined. In the unique forced symmetry of embodiments of the present invention, the location of data can and is predetermined, and most search operations in data storage and retrieval are avoided.

Figure 4:
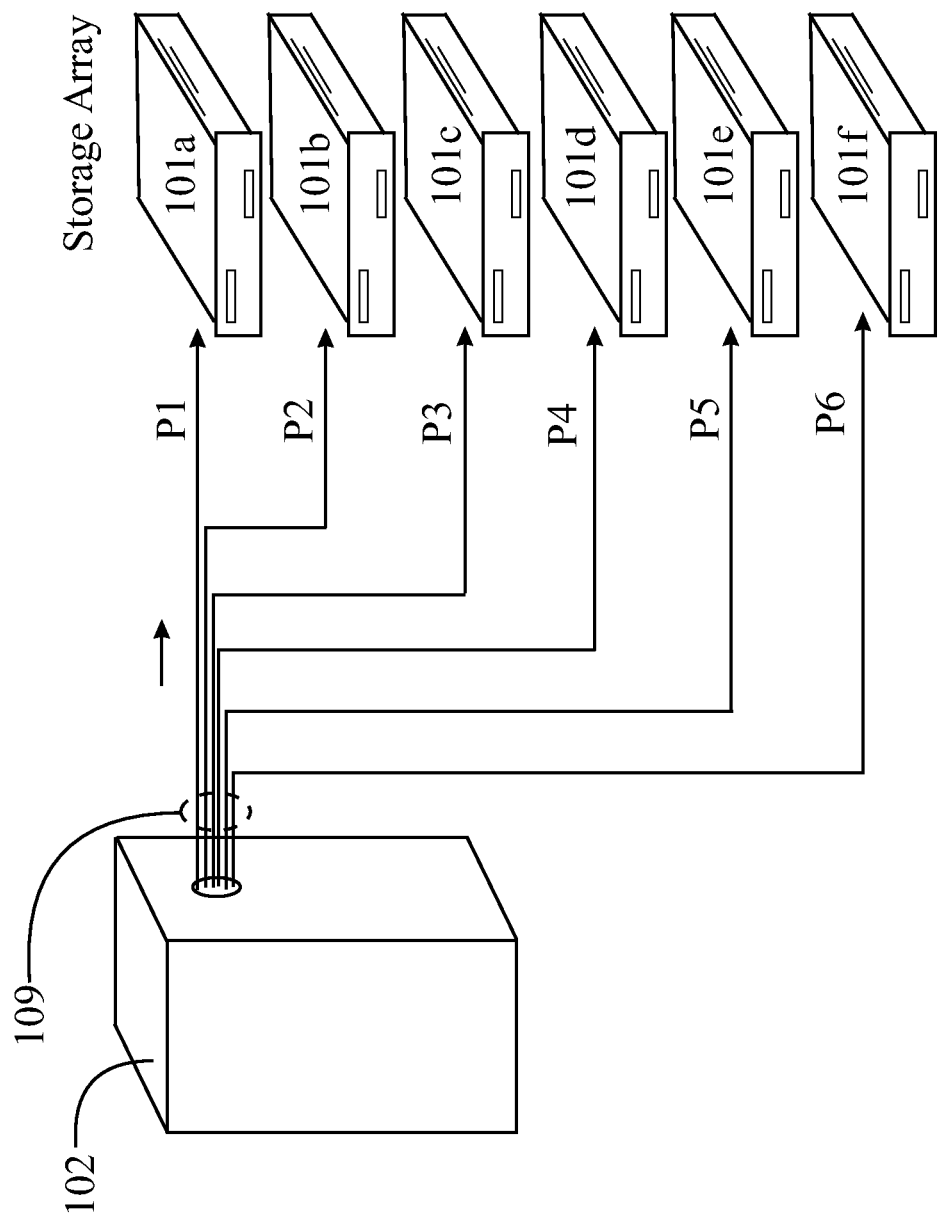
FIG. 4 is a very simplified diagram depicting storage in and among individual disks in a storage array, in another embodiment of the invention.

FIG. 4 is a very simplified diagram depicting storage in and among individual disks in a plural array, in another embodiment of the invention. In the example of FIG. 4, there are six dedicated physical data lanes, with one connected disk per lane. Data portions P1-P6 for a single file are still forced to a normalized size, and writes are simultaneous over all data lanes. This simplifies and accelerates operation.

Figure 5:
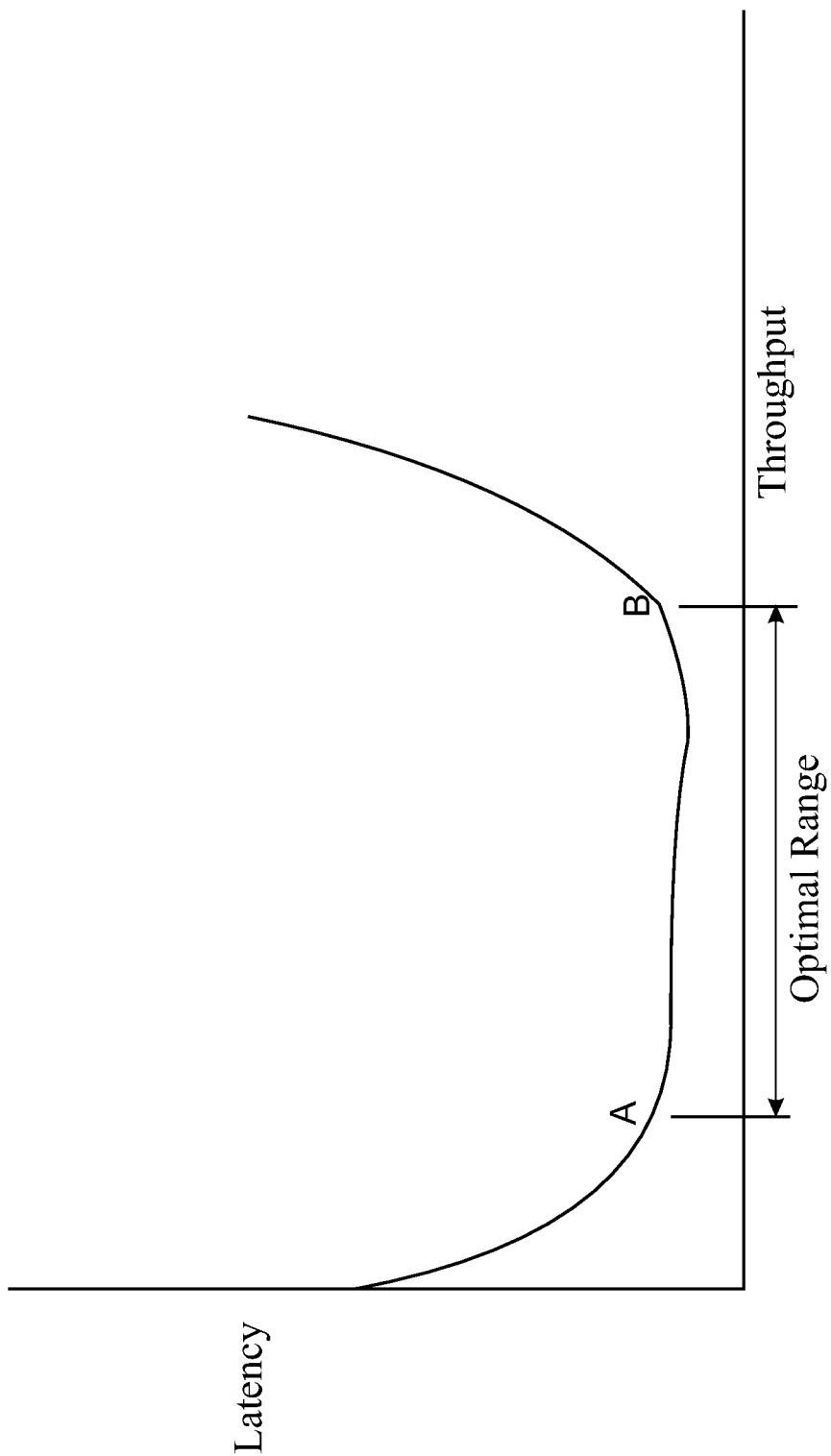
FIG. 5 is a graphical diagram depicting latency versus throughput for a typical single disk in a storage array.

FIG. 5 is a graphical diagram depicting latency versus throughput for a typical single disk. The optimal range and latency variation may vary widely from disk to disk among different makes and models, but the general shape of the curve holds for nearly all storage disks, showing that latency is high for low throughput, declines rapidly with increased throughput to a stabilized low rate, then rises sharply again at a higher throughput, above a recognizable threshold. There is typically an optimal range as shown between A and B. In an embodiment of the invention optimal throughput range to minimize latency for disks in a plural disk array is known from a manufacturer or may be determined experimentally. For optimal performance, minimum latency, it is necessary to operate all disks in a plural array within the optimal throughput range, which may be accomplished for specific use cases, by statistically determining the average and maximum files sizes to be transmitted and stored, and adjusting the number and characteristics of the common disks in the plural array to be sure that the throughput remains nearly always in the optimal range.

The skilled person will realize from the descriptions of embodiments and implementations provided above that, by the forced symmetry, maximum utilization of Page and Cache modes in storage for different storage devices may be used.

Use Case: Optical Sensor Data Capture on UAV's

The drone depicted as element 106 in FIG. 1 is also known as an Unmanned Arial Vehicle (UAV). Most drones are UAVs, but not all UAVs are drones, because balloons and fixed wing aircraft also may be unmanned, and remotely controlled. In many circumstances with UAVs, sensors take virtual data snapshots, perhaps 10 per second, and each may be a maximum of 20 Giga Bytes (GB) in size. Storage technology in the current art can't process 20 GB data packets adequately. Some people with knowledge in the art state that as little as 1 to 10% of the raw sensor data from a UAV is ever processed because of inadequate processing capacity in the UAV, where size, weight and power are limited, and due to latency effects in storage hubs remote from the UAV.

In the Current Art, data is typically stored sequentially on one device at a time. So, in the UAV example a 20 GB file transferred over a CPU-device data link with a capacity of 1 GB/second might take 20 seconds to store.

In one embodiment of the present invention the 20 GB file may be processed according to the strict requirements above, and then simultaneously be written in parallel to 40 devices using 40 dedicated data channels, and both the data portions and the channels will be normalized. By that is meant that the complete file size to be stored will be divided into 40 portions, each a subset of the whole, and of exactly equal size. In one embodiment the data channels are configured to each have exactly the same bandwidth so that the file can be transferred in just 2.5% of the single file/channel as given in the example of the current art. In this circumstance, the data capture may be completed in 0.5 seconds. In other embodiments this may be achieved in less than ⅒ second.

The skilled artisan will understand that the descriptions provided above are exemplary, and that there may be a variety of alterations to these descriptions within the scope of the invention, which is limited only by the claims that follow.

The invention claimed is:

1. A data storage system, comprising:
a central processing unit (CPU);
a plurality of n data storage devices R1-Rn, each data storage device having a same sector size;
a file system executing on the CPU; and
a digital communication system connecting the CPU and each one of the plurality of n data storage devices R1-Rn;
wherein the file system receives an original file of a first number of data bits in size, creates a new file of a second number of data bits in size, greater than the first number of data bits, comprising all the data structure of the original file, ensuring that the second number of data bits is evenly divisible by n and the same sector size of the n data storage devices, divides the second number of data bits by the n data storage devices, creating n equal portions P1-Pn, and stores one portion to each data storage device in the plural array simultaneously.

2. The system of claim 1 wherein the digital communication system is a logical system organized into integer n logical channels, one to each one of the n data storage devices, and the file system routes data to each data storage device along the logical channel leading to each data storage device.

3. The system of claim 1 wherein the digital communication system is a physical apparatus organized into integer n dedicated physical data lanes, one to each one of the n data storage devices, and the file system routes data to each data storage device along the physical data lane leading to each data storage device.

4. The system of claim 3 wherein the digital communication system is organized into integer m dedicated physical data lanes, serving the n data storage devices, where n is an integer multiple of m, with each data lane serving integer n/m data storage devices.

5. The system of claim 1 dedicated to an application wherein average and maximum file size is known, and number and throughput characteristics of data storage devices in the plural array are chosen to maintain throughput in the data storage devices within the optimal range for minimum latency.

6. The system of claim 5 further comprising an Unmanned Vehicle (UV) collecting digital files through one or more sensors, including image sensors, wherein the UV sends the files to the data storage system for storage in the plurality of data storage devices.

7. A computing method, comprising:
receiving, at a CPU of a computing platform having a plurality of n data storage devices, each of the data storage devices having a same sector size, connected to the CPU by a digital communication system, an original file of a first number of data bits in size;

creating, by a File System (FS), a new file of a second number of data bits in size, greater than the first number of data bits, comprising all the data structure of the original file, ensuring that the second number of data bits is evenly divisible by n and the same sector size of the n data storage devices;

dividing the new file of the second number of data bits by the n data storage devices, creating n portions P1-Pn; and transmitting and storing by the digital communication system one portion to each of the data storage devices simultaneously.

8. The method of claim 7 comprising organizing the digital communication system into integer n logical channels, one channel to each one of the n data storage devices, and routing data by the file system to each data storage device along the logical channel leading to each data storage device.

9. The method of claim 7 comprising organizing the digital communication system into integer n dedicated physical data lanes, one to each one of the n data storage devices, and routing by the file system data to each data storage device along the data lane leading to each data storage device.

10. The method of claim 9 comprising organizing the digital communication system into integer m dedicated physical data lanes, serving the n data storage devices, where n is an integer multiple of m, with each data lane serving n/m data storage devices.

11. The method of claim 7 dedicated to an application wherein average and maximum file size is known, comprising choosing number and throughput characteristics of the data storage devices accordingly to maintain throughput to the data storage devices within an optimal range for minimum latency.

12. The method of claim 11 further comprising collecting digital files through one or more sensors, including image sensors, of an Unmanned Arial Vehicle (UAV), and sending the files to the data storage system for storage in the plurality of data storage devices.

* * * * *